(12) United States Patent
Zhang et al.

(10) Patent No.: US 9,445,011 B2
(45) Date of Patent: Sep. 13, 2016

(54) DYNAMIC REARVIEW MIRROR ADAPTIVE DIMMING OVERLAY THROUGH SCENE BRIGHTNESS ESTIMATION

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Kent S. Lybecker, St. Clair Shores, MI (US); Jeffrey S. Piasecki, Rochester, MI (US); James Clem, Lapeer, MI (US); Charles A. Green, Canton, MI (US); Ryan M. Frakes, Bloomfield Hills, MI (US); Travis S. Hester, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 482 days.

(21) Appl. No.: 13/962,156

(22) Filed: Aug. 8, 2013

(65) Prior Publication Data

US 2014/0111637 A1    Apr. 24, 2014

Related U.S. Application Data

(60) Provisional application No. 61/716,799, filed on Oct. 22, 2012.

(51) Int. Cl.
| | |
|---|---|
| *H04N 7/00* | (2011.01) |
| *H04N 5/243* | (2006.01) |
| *B60R 1/00* | (2006.01) |
| *B60R 1/08* | (2006.01) |

(52) U.S. Cl.
CPC ............... *H04N 5/243* (2013.01); *B60R 1/00* (2013.01); *B60R 1/088* (2013.01); *B60R 2300/105* (2013.01)

(58) Field of Classification Search
None
See application file for complete search history.

(56) References Cited

U.S. PATENT DOCUMENTS

| | | | | |
|---|---|---|---|---|
| 5,956,181 | A * | 9/1999 | Lin | B60R 1/12 359/630 |
| 2002/0196340 | A1* | 12/2002 | Kato | B60R 1/00 348/148 |
| 2003/0122930 | A1* | 7/2003 | Schofield | B60R 1/00 348/148 |
| 2004/0042676 | A1* | 3/2004 | Srinivasa | B06T 5/008 382/254 |
| 2007/0036456 | A1* | 2/2007 | Hooper | G06T 5/008 382/274 |
| 2008/0069400 | A1* | 3/2008 | Zhu | G06K 9/3241 382/103 |
| 2009/0096937 | A1* | 4/2009 | Bauer | B60R 1/12 348/739 |
| 2011/0018990 | A1* | 1/2011 | Komoto | H04N 5/2251 348/116 |

* cited by examiner

*Primary Examiner* — Sath V Perungavoor
*Assistant Examiner* — Dakshesh Parikh

(57) ABSTRACT

A vehicle imaging system includes an image capture device capturing an image exterior of a vehicle. The captured image includes at least a portion of a sky scene. A processor generates a virtual image of a virtual sky scene from the portion of the sky scene captured by the image capture device. The processor determines a brightness of the virtual sky scene from the virtual image. The processor dynamically adjusts a brightness of the captured image based the determined brightness of the virtual image. A rear view mirror display device displays the adjusted captured image.

30 Claims, 11 Drawing Sheets

110

120

[http://www.google.com/patents/US9445011](http://www.google.com/patents/US9445011)

DYNAMIC REARVIEW MIRROR ADAPTIVE DIMMING OVERLAY THROUGH SCENE BRIGHTNESS ESTIMATION

CROSS-REFERENCE TO RELATED APPLICATIONS

This application claims priority of U.S. Provisional Application Ser. No. 61/716,799 filed Oct. 22, 2012, the disclosure of which is incorporated by reference.

BACKGROUND OF INVENTION

An embodiment relates generally to image capture and processing for dynamic rearview mirror display features.

Vehicle systems often use in-vehicle vision systems for rear-view scene detections, side-view scene detection, and forward view scene detection. For those applications that require graphic overlay or to emphasize an area of the captured image, it is critical to accurately calibrate the position and orientation of the camera with respect to the vehicle and the surrounding objects. Camera modeling which takes a captured input image from a device and remodels the image to show or enhance a respective region of the captured image must reorient all objects within the image without distorting the image so much that it becomes unusable or inaccurate to the person viewing the reproduced image.

When a view is reproduced in a display screen, the brightness of the scene needs to be determined and adjusted. Typically, for rearview mirrors, a manual dimming function is actuated by the operator for adjusting the dimming accordingly. Automatic sensing may be used; however, this is expensive and requires an added sensor to sense for brightness of the scene.

SUMMARY OF THE INVENTION

An embodiment relates generally to image capture and processing for dynamic rearview mirror display features. Brightness for dynamic rearview mirror device may be adjusted based on the scene analyzed by a vision image capture device. A virtual scene may be generated from at least a portion of the real image captured and may be analyzed for determining an illumination intensity of the scene for applying brightness adjustment to the rearview mirror display device. Moreover, the image overlays of vehicle components of the vehicle can be displayed in the rearview mirror display feature so as to give the driver a sense of relative position of the surrounding objects captured by the image display device to the vehicle.

A vehicle imaging system includes an image capture device capturing an image exterior of a vehicle. The captured image includes at least a portion of a sky scene. A processor generates a virtual image of a virtual sky scene from the portion of the sky scene captured by the image capture device. The processor determines a brightness of the virtual sky scene from the virtual image. The processor dynamically adjusts a brightness of the captured image based the determined brightness of the virtual image. A rear view mirror display device displays the adjusted captured image.

A method for dynamically adjusting a brightness of an image on rearview display device. An image exterior of a vehicle is captured by an image capture device. The captured image includes at least a portion of a sky scene. A virtual image of a virtual sky scene generated by a processor is from the portion of the sky scene captured by the image capture device. The processor determines a brightness of the virtual sky scene from the virtual image. The processor dynamically adjusts a brightness of the captured image based the determined brightness of the virtual image. The adjusted captured image is displayed on a rear view mirror display device for displaying the adjusted captured image.

DETAILED DESCRIPTION

Figure 1:
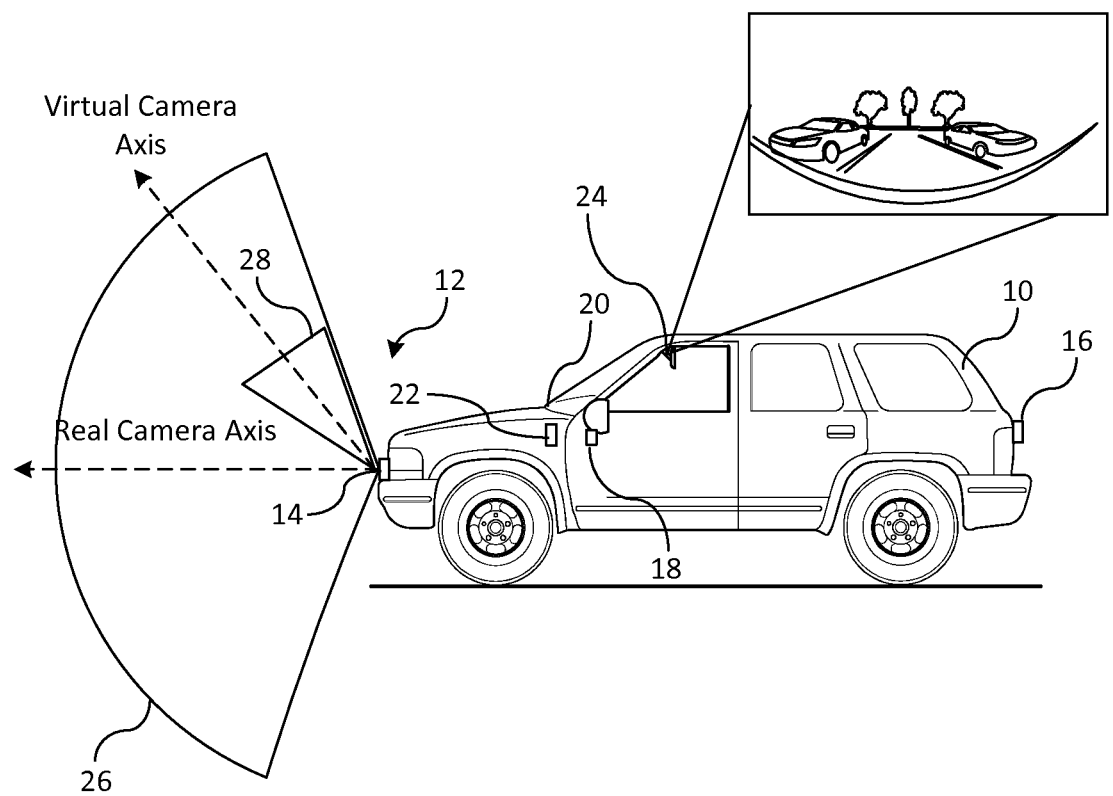
FIG. 1 is an illustration of a vehicle including a surround view vision-based imaging system.

There is shown in FIG. 1, a vehicle 10 traveling along a road. A vision-based imaging system 12 captures images of the road. The vision-based imaging system 12 captures images surrounding the vehicle based on the location of one or more vision-based capture devices. In the embodiments described herein, the vision-based imaging system captures images rearward of the vehicle, forward of the vehicle, and to the sides of the vehicle.

The vision-based imaging system 12 includes a front-view camera 14 for capturing a field-of-view (FOV) forward of the vehicle 10, a rear-view camera 16 for capturing a FOV rearward of the vehicle, a left-side view camera 18 for capturing a FOV to a left side of the vehicle, and a right-side view camera 20 for capturing a FOV on a right side of the vehicle. The cameras 14-20 can be any camera suitable for the purposes described herein, many of which are known in the automotive art, that are capable of receiving light, or other radiation, and converting the light energy to electrical signals in a pixel format using, for example, charged coupled devices (CCD). The cameras 14-20 generate frames of image data at a certain data frame rate that can be stored for subsequent processing. The cameras 14-20 can be mounted within or on any suitable structure that is part of the vehicle 10, such as bumpers, facie, grill, side-view mirrors, door panels, behind the windshield, etc., as would be well understood and appreciated by those skilled in the art. Image data from the cameras 14-20 is sent to a processor 22 that processes the image data to generate images that can be displayed on a review mirror display device 24.

The present invention utilizes the captured scene from the vision imaging based device 12 for detecting lighting conditions of the captured scene, which is then used to adjust a dimming function of the image display of the rearview mirror 24. Preferably, a wide angle lens camera is utilized for capturing an ultra-wide FOV of a scene exterior of the vehicle, such a region represented by 26. The vision imaging based device 12 focuses on a respective region of the captured image, which is preferably a region that includes the sky 28 as well as the sun, and high-beams from other vehicles at night. By focusing on the illumination intensity of the sky, the illumination intensity level of the captured scene can be determined. This objective is to build a synthetic image as taken from a virtual camera having an optical axis that is directed at the sky for generating a virtual sky view image. Once a sky view is generated from the virtual camera directed at the sky, a brightness of the scene may be determined. Thereafter, the image displayed through the rearview mirror 24 or any other display within the vehicle may be dynamically adjusted. In addition, a graphic image overlay may be projected onto the image display of the rearview mirror 24. The image overlay replicates components of the vehicle (e.g., head rests, rear window trim, c-pillars) that includes line-based overlays (e.g., sketches) that would typically be seen by a driver when viewing a reflection through the rearview mirror having ordinary reflection properties. The image displayed by the graphic overlay may also be adjusted as to the brightness of the scene to maintain a desired translucency such that the graphic overlay does not interfere with the scene reproduced on the rearview mirror, and is not washed out.

In order to generate the virtual sky image based on the capture image of a real cameral, the captured image must be modeled, processed, and view synthesized for generating a virtual image from the real image. The following description details how this process is accomplished. The present invention uses an image modeling and de-warping process for both narrow FOV and ultra-wide FOV cameras that employs a simple two-step approach and offers fast processing times and enhanced image quality without utilizing radial distortion correction. Distortion is a deviation from rectilinear projection, a projection in which straight lines in a scene remain straight in an image. Radial distortion is a failure of a lens to be rectilinear.

The two-step approach as discussed above includes (1) applying a camera model to the captured image for projecting the captured image on a non-planar imaging surface and (2) applying a view synthesis for mapping the virtual image projected on to the non-planar surface to the real display image. For view synthesis, given one or more images of a specific subject taken from specific points with specific camera setting and orientations, the goal is to build a synthetic image as taken from a virtual camera having a same or different optical axis.

The proposed approach provides effective surround view and dynamic rearview mirror functions with an enhanced de-warping operation, in addition to a dynamic view synthesis for ultra-wide FOV cameras. Camera calibration as used herein refers to estimating a number of camera parameters including both intrinsic and extrinsic parameters. The intrinsic parameters include focal length, image center (or principal point), radial distortion parameters, etc. and extrinsic parameters include camera location, camera orientation, etc.

Camera models are known in the art for mapping objects in the world space to an image sensor plane of a camera to generate an image. One model known in the art is referred to as a pinhole camera model that is effective for modeling the image for narrow FOV cameras. The pinhole camera model is defined as:

$$s\underbrace{\begin{bmatrix} u \\ v \\ 1 \end{bmatrix}}_{m} = \underbrace{\begin{bmatrix} f_u & \gamma & u_c \\ 0 & f_v & v_c \\ 0 & 0 & 1 \end{bmatrix}}_{A} \underbrace{\begin{bmatrix} r_1 & r_2 & r_3 & t \end{bmatrix}}_{[R\ t]} \underbrace{\begin{bmatrix} x \\ y \\ z \\ 1 \end{bmatrix}}_{M} \quad (1)$$

Figure 2:
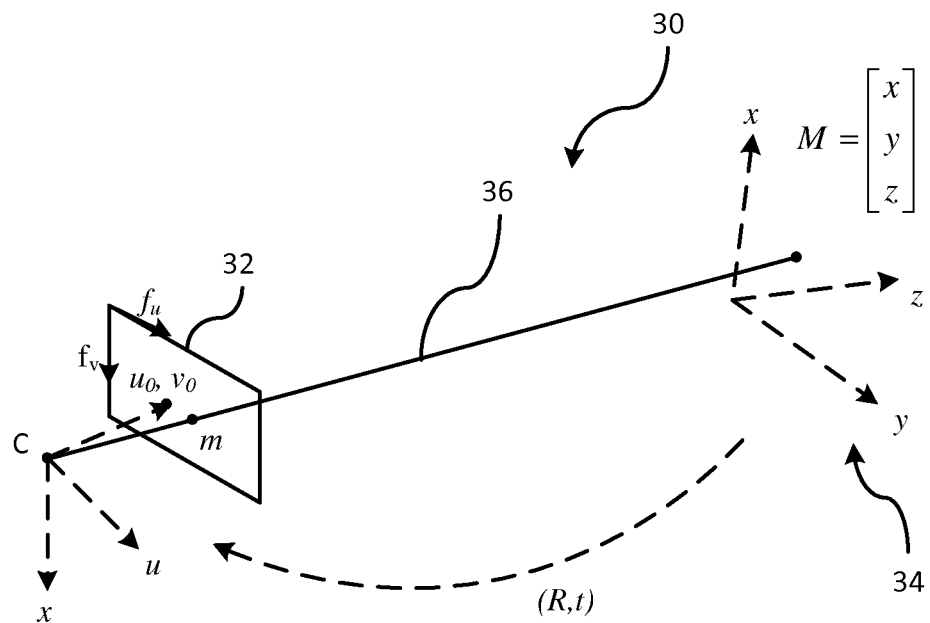
FIG. 2 is an illustration for a pinhole camera model.

FIG. 2 is an illustration 30 for the pinhole camera model and shows a two dimensional camera image plane 32 defined by coordinates u, v, and a three dimensional object space 34 defined by world coordinates x, y, and z. The distance from a focal point C to the image plane 32 is the focal length f of the camera and is defined by focal length $f_u$ and $f_v$. A perpendicular line from the point C to the principal point of the image plane 32 defines the image center of the plane 32 designated by $u_0$, $v_0$. In the illustration 30, an object point M in the object space 34 is mapped to the image plane 32 at point m, where the coordinates of the image point m is $u_c$, $v_c$.

Equation (1) includes the parameters that are employed to provide the mapping of point M in the object space 34 to point min the image plane 32. Particularly, intrinsic parameters include $f_u$, $f_v$, $u_c$, $v_c$ and $\gamma$ and extrinsic parameters include a 3 by 3 matrix R for the camera rotation and a 3 by 1 translation vector t from the image plane 32 to the object space 34. The parameter $\gamma$ represents a skewness of the two image axes that is typically negligible, and is often set to zero.

Since the pinhole camera model follows rectilinear projection which a finite size planar image surface can only cover a limited FOV range (<<180° FOV), to generate a cylindrical panorama view for an ultra-wide (~180° FOV) fisheye camera using a planar image surface, a specific camera model must be utilized to take horizontal radial distortion into account. Some other views may require other specific camera modeling, (and some specific views may not be able to be generated). However, by changing the image plane to a non-planar image surface, a specific view can be easily generated by still using the simple ray tracing and pinhole camera model. As a result, the following description will describe the advantages of utilizing a non-planar image surface.

The rearview mirror display device 24 (shown in FIG. 1) outputs images captured by the vision-based imaging system 12. The images may be altered images that may be converted to show enhanced viewing of a respective portion of the FOV of the captured image. For example, an image may be altered for generating a panoramic scene, or an image may be generated that enhances a region of the image in the direction of which a vehicle is turning. The proposed approach as described herein models a wide FOV camera with a concave imaging surface for a simpler camera model without radial distortion correction. This approach utilizes virtual view synthesis techniques with a novel camera imaging surface modeling (e.g., light-ray-based modeling). This technique has a variety of applications of rearview camera applications that include dynamic guidelines, 360 surround view camera system, and dynamic rearview mirror feature. This technique simulates various image effects through the simple camera pin-hole model with various camera imaging surfaces. It should be understood that other models, including traditional models, can be used aside from a camera pin-hole model.

Figure 3:
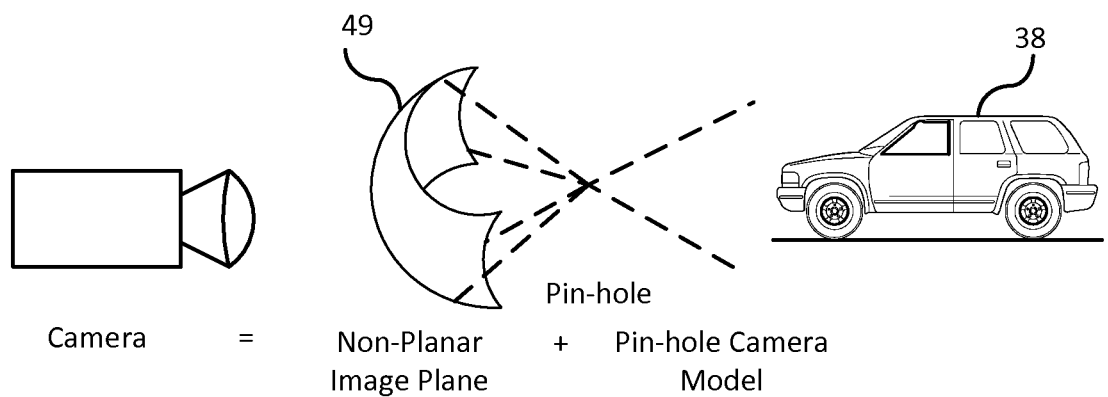
FIG. 3 is an illustration of a non-planar pin-hole camera model.

FIG. 3 illustrates a preferred technique for modeling the captured scene 38 using a non-planar image surface. Using the pin-hole model, the captured scene 38 is projected onto a non-planar image 49 (e.g., concave surface). No radial distortion correction is applied to the projected image since the image is being displayed on a non-planar surface.

Figure 5:
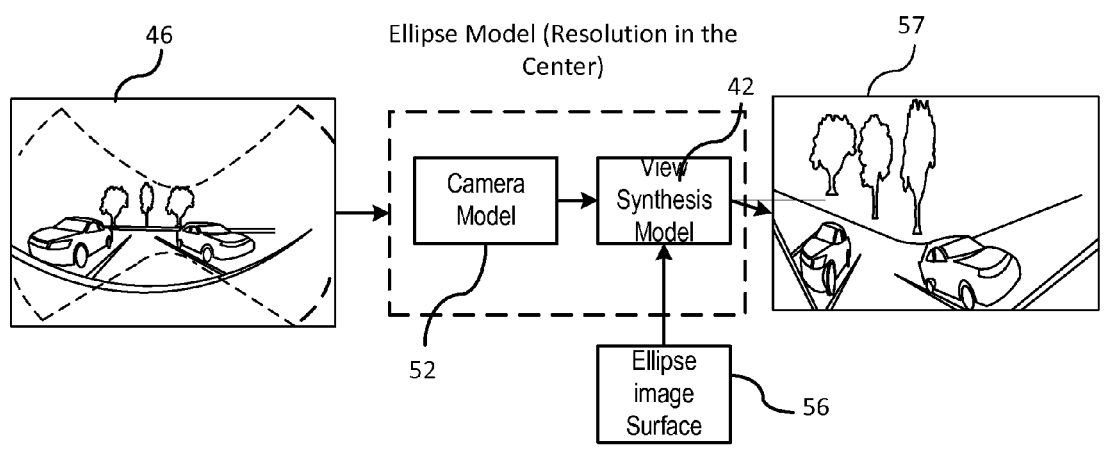
FIG. 5 is a block flow diagram utilizing an ellipse image surface model.

A view synthesis technique is applied to the projected image on the non-planar surface for de-warping the image.

as shown in the de-warped image 57, the objects at the center forefront of the de-warped image are more enhanced using the ellipse model in comparison to FIG. 5.

Dynamic view synthesis is a technique by which a specific view synthesis is enabled based on a driving scenario of a vehicle operation. For example, special synthetic modeling techniques may be triggered if the vehicle is in driving in a parking lot versus a highway, or may be triggered by a proximity sensor sensing an object to a respective region of the vehicle, or triggered by a vehicle signal (e.g., turn signal, steering wheel angle, or vehicle speed). The special synthesis modeling technique may be to apply respective shaped models to a captured image, or apply virtual pan, tilt, or directional zoom depending on a triggered operation.

Figure 6:
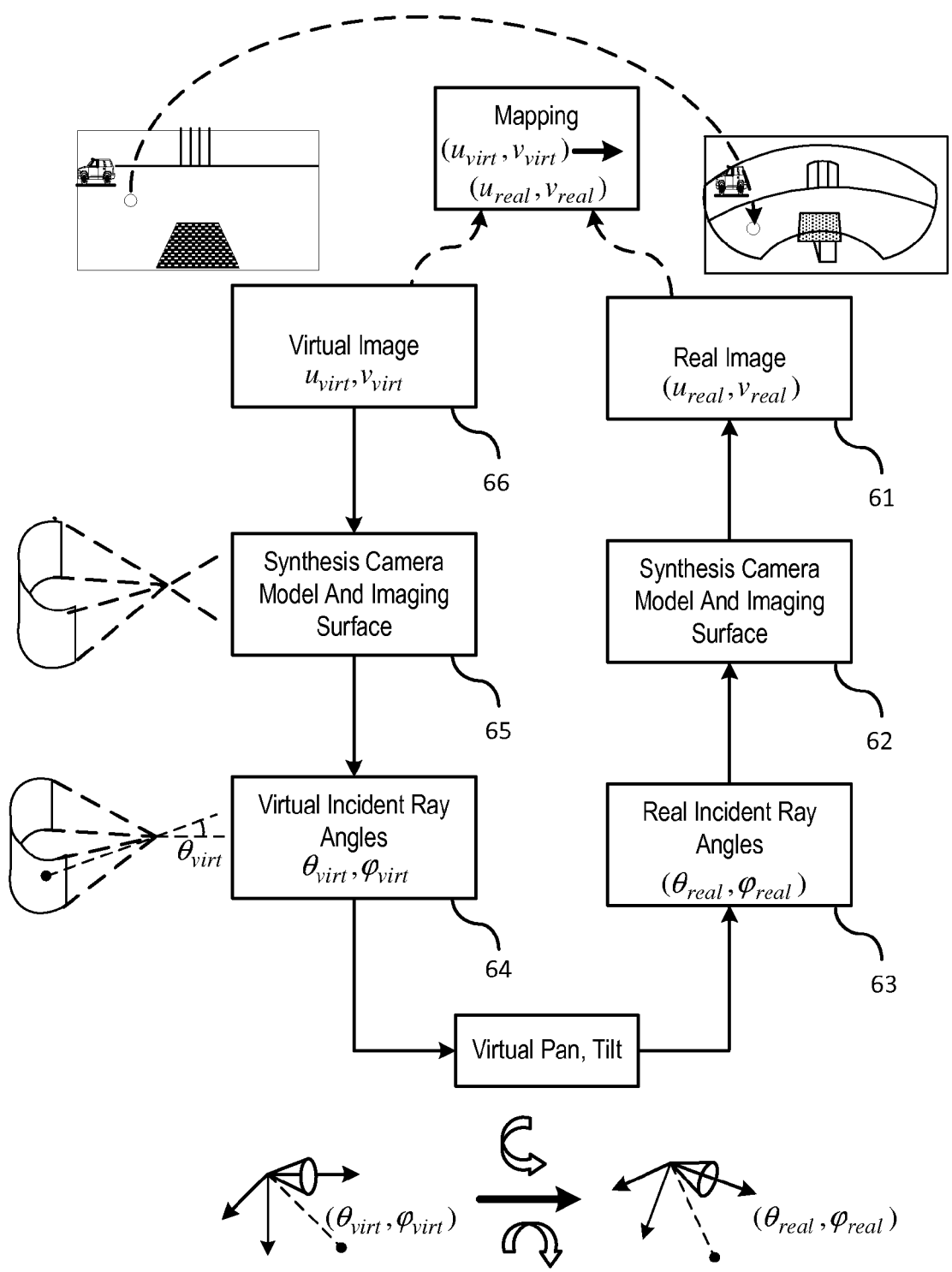
FIG. 6 is a flow diagram of view synthesis for mapping a point from a real image to the virtual image.

FIG. 6 illustrates a flow diagram of view synthesis for mapping a point from a real image to the virtual image. In block 61, a real point on the captured image is identified by coordinates $u_{real}$ and $u_{real}$ which identify where an incident ray contacts an image surface. An incident ray can be represented by the angles $(\theta, \phi)$, where $\theta$ is the angle between the incident ray and an optical axis, and $\phi$ is the angle between the x axis and the projection of the incident ray on the x-y plane. To determine the incident ray angle, a real camera model is pre-determined and calibrated.

In block 62, the real camera model is defined, such as the fisheye model ($r_d$=func($\theta$) and $\phi$). That is, the incident ray as seen by a real fish-eye camera view may be illustrated as follows:

$$\text{Incident ray} \rightarrow \begin{bmatrix} \theta: \text{angle between incident ray} \\ \text{and optical axis} \\ \varphi: \text{angle between } x_{c1} \text{ and} \\ \text{incident ray projection} \\ \text{on the } x_{c1} - y_{c1} \text{ plane} \end{bmatrix} \rightarrow \begin{bmatrix} r_d = func(\theta) \\ \varphi \end{bmatrix} \rightarrow \begin{bmatrix} u_{c1} = r_d \cdot \cos(\varphi) \\ v_{c1} = r_d \cdot \sin(\varphi) \end{bmatrix} \quad (2)$$

In FIG. 3, image de-warping is achieved using a concave image surface. Such surfaces may include, but are not limited to, a cylinder and ellipse image surfaces. That is, the captured scene is projected onto a cylindrical like surface using a pin-hole model. Thereafter, the image projected on the cylinder image surface is laid out on the flat in-vehicle image display device. As a result, the parking space which the vehicle is attempting to park is enhanced for better viewing for assisting the driver in focusing on the area of intended travel.

Figure 4:
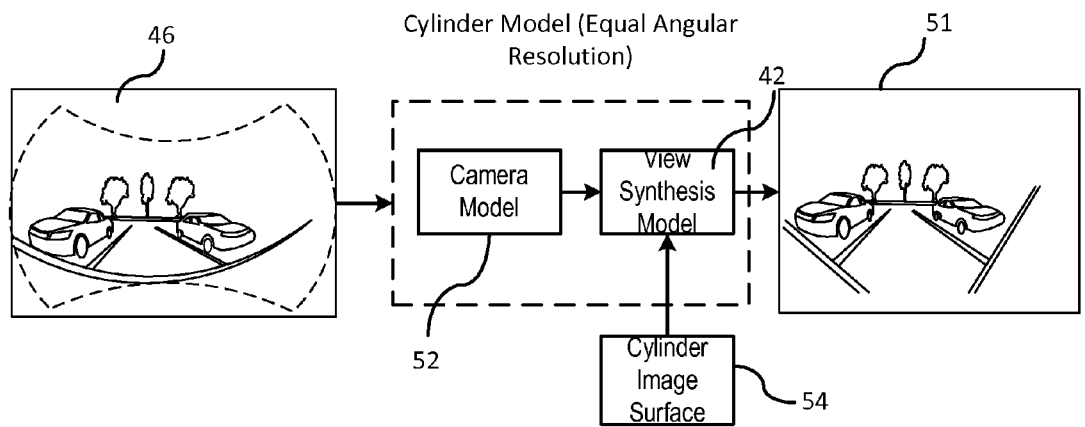
FIG. 4 is a block flow diagram utilizing cylinder image surface modeling.

FIG. 4 illustrates a block flow diagram for applying cylinder image surface modeling to the captured scene. A captured scene is shown at block 46. Camera modeling 52 is applied to the captured scene 46. As described earlier, the camera model is preferably a pin-hole camera model, however, traditional or other camera modeling may be used. The captured image is projected on a respective surface using the pin-hole camera model. The respective image surface is a cylindrical image surface 54. View synthesis 42 is performed by mapping the light rays of the projected image on the cylindrical surface to the incident rays of the captured real image to generate a de-warped image. The result is an enhanced view of the available parking space where the parking space is centered at the forefront of the de-warped image 51.

Figure 7:
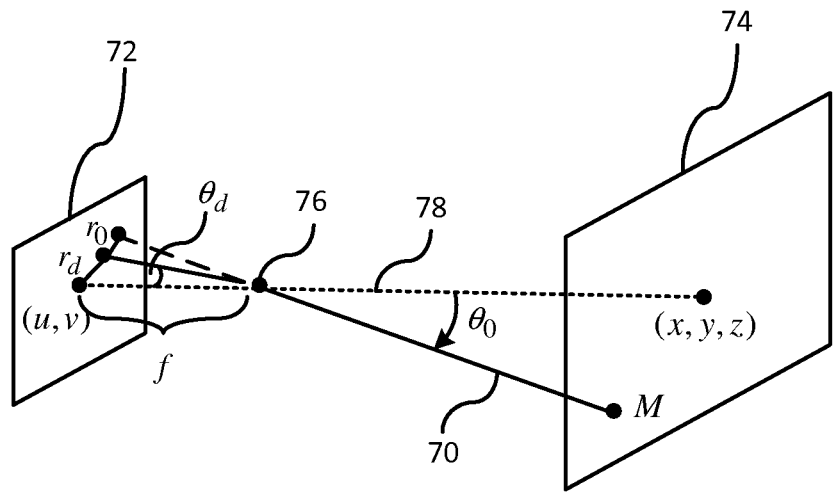
FIG. 7 is an illustration of a radial distortion correction model.

FIG. 5 illustrates a flow diagram for utilizing an ellipse image surface model to the captured scene utilizing the pin-hole model. The ellipse image model 56 applies greater resolution to the center of the capture scene 46. Therefore, where $u_{c1}$ represents $u_{real}$ and $v_{c1}$ represents $v_{real}$. A radial distortion correction model is shown in FIG. 7. The radial distortion model, represented by equation (3) below, sometimes referred to as the Brown-Conrady model, that provides a correction for non-severe radial distortion for objects imaged on an image plane 72 from an object space 74. The focal length f of the camera is the distance between point 76 and the image center where the lens optical axis intersects with the image plane 72. In the illustration, an image location $r_0$ at the intersection of line 70 and the image plane 72 represents a virtual image point $m_0$ of the object point M if a pinhole camera model is used. However, since the camera image has radial distortion, the real image point m is at location $r_d$, which is the intersection of the line 78 and the image plane 72. The values $r_0$ and $r_d$ are not points, but are the radial distance from the image center $u_0, v_0$ to the image points $m_0$ and m.

$$r_d = r_0(1 + k_1 \cdot r_0^2 k_2 \cdot r_0^4 + k_2 \cdot r_0^6 + \quad (3)$$

The point $r_0$ is determined using the pinhole model discussed above and includes the intrinsic and extrinsic parameters mentioned. The model of equation (3) is an even order polynomial that converts the point $r_0$ to the point $r_d$ in the image plane 72, where k is the parameters that need to be determined to provide the correction, and where the number of the parameters k define the degree of correction accuracy. The calibration process is performed in the laboratory environment for the particular camera that determines the parameters k. Thus, in addition to the intrinsic and extrinsic parameters for the pinhole camera model, the model for equation (3) includes the additional parameters k to determine the radial distortion. The non-severe radial distortion correction provided by the model of equation (3) is typically effective for wide FOV cameras, such as 135° FOV cameras. However, for ultra-wide FOV cameras, i.e., 180° FOV, the radial distortion is too severe for the model of equation (3) to be effective. In other words, when the FOV of the camera exceeds some value, for example, 140°-150°, the value $r_0$ goes to infinity when the angle θ approaches 90°. For ultra-wide FOV cameras, a severe radial distortion correction model shown in equation (4) has been proposed in the art to provide correction for severe radial distortion.

Figure 8:
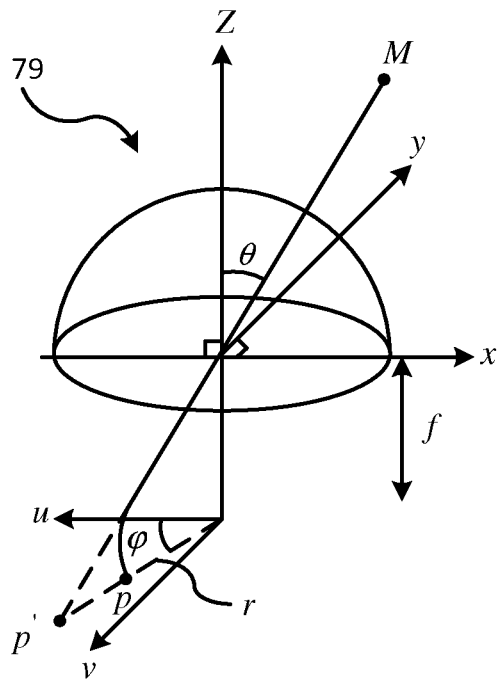
FIG. 8 is an illustration of a severe radial distortion model.

FIG. 8 illustrates a fisheye model which shows a dome to illustrate the FOV. This dome is representative of a fisheye lens camera model and the FOV that can be obtained by a fisheye model which is as large as 180 degrees or more. A fisheye lens is an ultra wide-angle lens that produces strong visual distortion intended to create a wide panoramic or hemispherical image. Fisheye lenses achieve extremely wide angles of view by forgoing producing images with straight lines of perspective (rectilinear images), opting instead for a special mapping (for example: equisolid angle), which gives images a characteristic convex non-rectilinear appearance This model is representative of severe radial distortion due which is shown in equation (4) below, where equation (4) is an odd order polynomial, and includes a technique for providing a radial correction of the point $r_0$ to the point $r_d$ in the image plane 79. As above, the image plane is designated by the coordinates u and v, and the object space is designated by the world coordinates x, y, z. Further, θ is the incident angle between the incident ray and the optical axis. In the illustration, point p' is the virtual image point of the object point M using the pinhole camera model, where its radial distance $r_0$ may go to infinity when θ approaches 90°. Point p at radial distance r is the real image of point M, which has the radial distortion that can be modeled by equation (4).

The values p in equation (4) are the parameters that are determined. Thus, the incidence angle θ is used to provide the distortion correction based on the calculated parameters during the calibration process.

$$r_d = p_1 \cdot \theta_0 + p_2 \cdot \theta_0^3 + p_3 \cdot \theta_0^5 + \ldots \quad (4)$$

Various techniques are known in the art to provide the estimation of the parameters k for the model of equation (3) or the parameters p for the model of equation (4). For example, in one embodiment a checker board pattern is used and multiple images of the pattern are taken at various viewing angles, where each corner point in the pattern between adjacent squares is identified. Each of the points in the checker board pattern is labeled and the location of each point is identified in both the image plane and the object space in world coordinates. The calibration of the camera is obtained through parameter estimation by minimizing the error distance between the real image points and the reprojection of 3D object space points.

In block 63, a real incident ray angle ($\theta_{real}$) and ($\phi_{real}$) are determined from the real camera model. The corresponding incident ray will be represented by a ($\theta_{real}$, $\phi_{real}$).

In block 64, a virtual incident ray angle $\theta_{virt}$ and corresponding $\phi_{virt}$ is determined. If there is no virtual tilt and/or pan, then ($\theta_{virt}$, $\phi_{virt}$) will be equal to ($\theta_{real}$, $\phi_{real}$). If virtual tilt and/or pan are present, then adjustments must be made to determine the virtual incident ray. Discussion of the virtual incident ray will be discussed in detail later.

Referring again to FIG. 6, in block 65, once the incident ray angle is known, then view synthesis is applied by utilizing a respective camera model (e.g., pinhole model) and respective non-planar imaging surface (e.g., cylindrical imaging surface).

In block 66, the virtual incident ray that intersects the non-planar surface is determined in the virtual image. The coordinate of the virtual incident ray intersecting the virtual non-planar surface as shown on the virtual image is represented as ($u_{virt}$, $v_{virt}$). As a result, a mapping of a pixel on the virtual image ($u_{virt}$, $v_{virt}$) corresponds to a pixel on the real image ($u_{real}$, $v_{real}$).

It should be understood that while the above flow diagram represents view synthesis by obtaining a pixel in the real image and finding a correlation to the virtual image, the reverse order may be performed when utilizing in a vehicle. That is, every point on the real image may not be utilized in the virtual image due to the distortion and focusing only on a respective highlighted region (e.g., cylindrical/elliptical shape). Therefore, if processing takes place with respect to these points that are not utilized, then time is wasted in processing pixels that are not utilized. Therefore, for an in-vehicle processing of the image, the reverse order is performed. That is, a location is identified in a virtual image and the corresponding point is identified in the real image. The following describes the details for identifying a pixel in the virtual image and determining a corresponding pixel in the real image.

Figure 9:
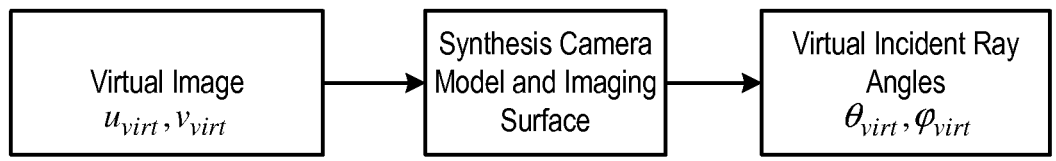
FIG. 9 is a block diagram for applying view synthesis for determining a virtual incident ray angle based on a point on a virtual image.
Figure 10:
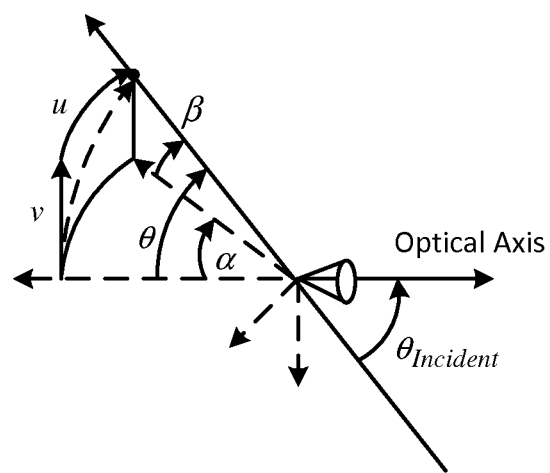
FIG. 10 is an illustration of an incident ray projected onto a respective cylindrical imaging surface model.

FIG. 9 illustrates a block diagram of the first step for obtaining a virtual coordinate ($u_{virt}$, $v_{virt}$) and applying view synthesis for identifying virtual incident angles ($\theta_{virt}$, $\phi_{virt}$). FIG. 10 represents an incident ray projected onto a respective cylindrical imaging surface model. The horizontal projection of incident angle θ is represented by the angle α. The formula for determining angle α follows the equidistance projection as follows:

$$\frac{u_{virt} - u_0}{f_u} = \alpha \quad (5)$$

where $u_{virt}$ is the virtual image point u-axis (horizontal) coordinate, $f_u$ is the u direction (horizontal) focal length of the camera, and $u_0$ is the image center u-axis coordinate.

Next, the vertical projection of angle θ is represented by the angle β. The formula for determining angle β follows the rectilinear projection as follows:

$$\frac{v_{virt} - v_0}{f_v} = \tan\beta \quad (6)$$

where $v_{virt}$ is the virtual image point v-axis (vertical) coordinate, $f_v$ is the v direction (vertical) focal length of the camera, and $v_0$ is the image center v-axis coordinate.

The incident ray angles can then be determined by the following formulas:

$$\begin{cases} \theta_{virt} = \arccos(\cos(\alpha) \cdot \cos(\beta)) \\ \varphi_{virt} = \arctan(\sin(\alpha) \cdot \tan(\beta)) \end{cases} \quad (7)$$

As described earlier, if there is no pan or tilt between the optical axis of the virtual camera and the real camera, then the virtual incident ray ($\theta_{virt}$, $\phi_{virt}$) and the real incident ray ($\theta_{real}$, $\phi_{real}$) are equal. If pan and/or tilt are present, then compensation must be made to correlate the projection of the virtual incident ray and the real incident ray.

Figure 11:
FIG. 11 is a block diagram for applying a virtual pan/tilt for determining a ray incident ray angle based on a virtual incident ray angle.

FIG. 11 illustrates the block diagram conversion from virtual incident ray angles to real incident ray angles when virtual tilt and/or pan are present. Since optical axis of the virtual cameras will be focused toward the sky and the real camera will be substantially horizontal to the road of travel, a difference is the axes requires a tilt and/or pan rotation operation.

Figure 12:
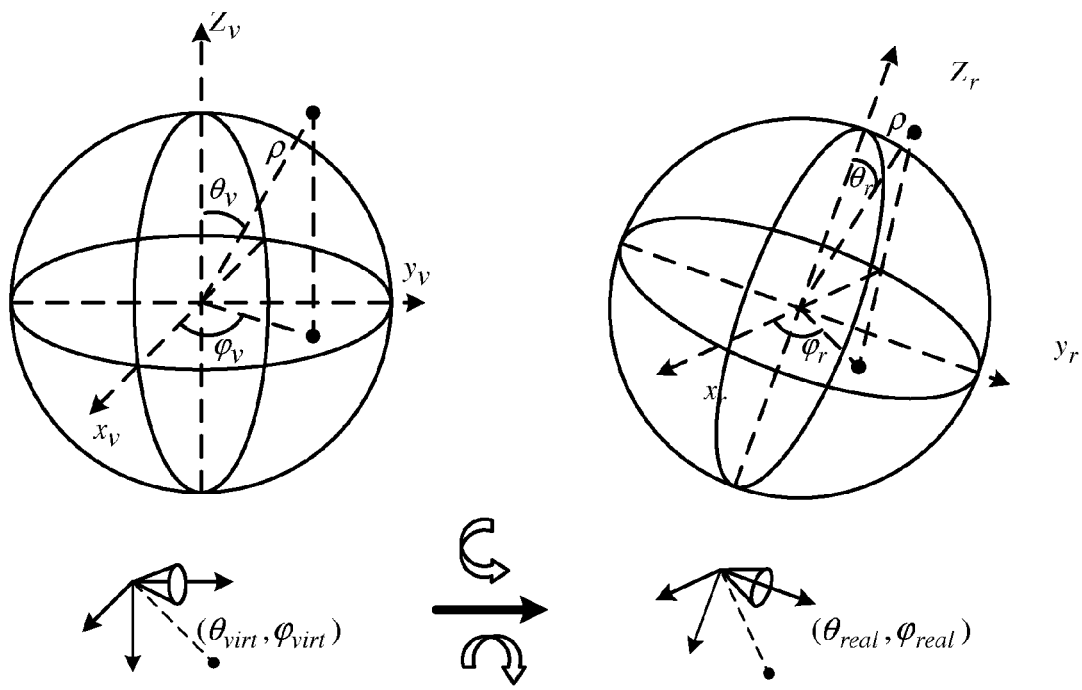
FIG. 12 is a rotational representation of a pan/tilt between a virtual incident ray angle and a real incident ray angle.

FIG. 12 illustrates a comparison between axes changes from virtual to real due to virtual pan and/or tilt rotations. The incident ray location does not change, so the correspondence virtual incident ray angles and the real incident ray angle as shown is related to the pan and tilt. The incident ray is represented by the angles $(\theta, \phi)$, where $\theta$ is the angle between the incident ray and the optical axis (represented by the z axis), and $\phi$ is the angle between x axis and the projection of the incident ray on the x-y plane.

For each determined virtual incident ray $(\theta_{virt}, \phi_{virt})$, any point on the incident ray can be represented by the following matrix:

$$P_{virt} = \rho \cdot \begin{bmatrix} \sin(\theta_{virt}) \cdot \cos(\theta_{virt}) \\ \sin(\theta_{virt}) \cdot \sin(\theta_{virt}) \\ \cos(\theta_{virt}) \end{bmatrix}, \quad (8)$$

where $\rho$ is the distance of the point form the origin.

The virtual pan and/or tilt can be represented by a rotation matrix as follows:

$$R_{rot} = R_{tilt} \cdot R_{pan} = \begin{bmatrix} 1 & 0 & 0 \\ 0 & \cos(\beta) & \sin(\beta) \\ 0 & -\sin(\beta) & \cos(\beta) \end{bmatrix} \cdot \begin{bmatrix} \cos(\alpha) & 0 & -\sin(\alpha) \\ 0 & 1 & 0 \\ \sin(\alpha) & 0 & \cos(\alpha) \end{bmatrix} \quad (9)$$

where $\alpha$ is the pan angle, and $\beta$ is the tilt angle.

After the virtual pan and/or tilt rotation is identified, the coordinates of a same point on the same incident ray (for the real) will be as follows:

$$P_{real} = R_{rot} \cdot R_{virt} = \rho \cdot R_{rot} \begin{bmatrix} \sin(\theta_{virt}) \cdot \cos(\theta_{virt}) \\ \sin(\theta_{virt}) \cdot \sin(\theta_{virt}) \\ \cos(\theta_{virt}) \end{bmatrix} = \rho \begin{bmatrix} a_1 \\ a_2 \\ a_3 \end{bmatrix}, \quad (10)$$

The new incident ray angles in the rotated coordinates system will be as follows:

$$\theta_{real} = \arctan\left(\frac{\sqrt{a_1^2 + a_2^2}}{a_3}\right), \quad (11)$$

$$\phi = real = \arctan\left(\frac{a_2}{a_1}\right).$$

As a result, a correspondence is determined between $(\theta_{virt}, \phi_{virt})$ and $(\theta_{real}, \phi_{real})$ when tilt and/or pan is present with respect to the virtual camera model. It should be understood that that the correspondence between $(\theta_{virt}, \phi_{virt})$ and $(\theta_{real}, \phi_{real})$ is not related to any specific point at distance $\rho$ on the incident ray. The real incident ray angle is only related to the virtual incident ray angles $(\theta_{virt}, \phi_{virt})$ and virtual pan and/or tilt angles $\alpha$ and $\beta$.

Once the real incident ray angles are known, the intersection of the respective light rays on the real image may be readily determined as discussed earlier. The result is a mapping of a virtual point on the virtual image to a corresponding point on the real image. This process is performed for each point on the virtual image for identifying corresponding point on the real image and generating the resulting image.

Figure 13:
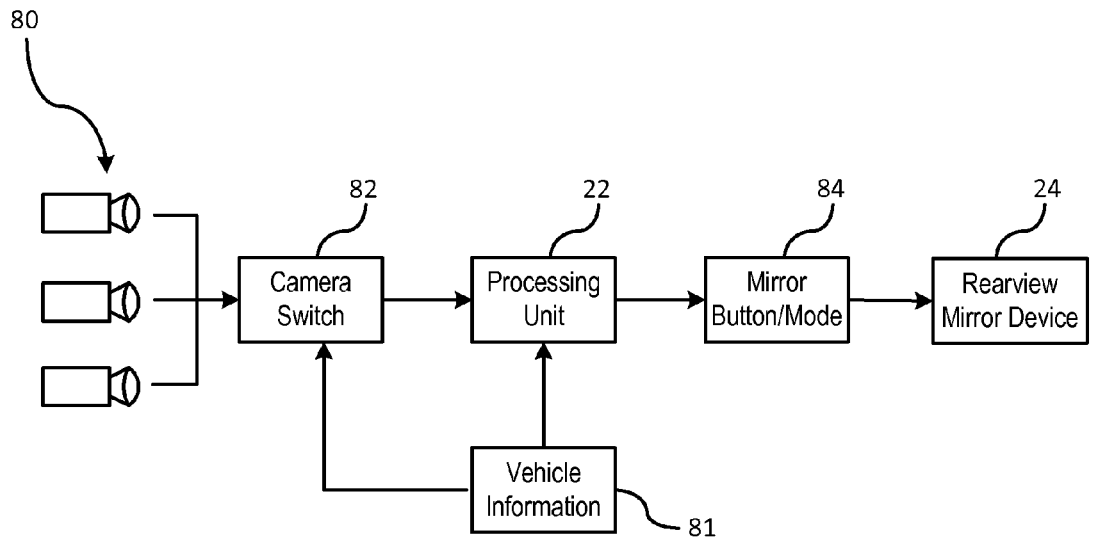
FIG. 13 is a block diagram for displaying the captured images from one or more image capture devices on the rearview mirror display device.

FIG. 13 illustrates a block diagram of the overall system diagrams for displaying the captured images from one or more image capture devices on the rearview mirror display device. A plurality of image capture devices are shown generally at 80. The plurality of image capture devices 80 includes at least one front camera, at least one side camera, and at least one rearview camera.

The images by the image capture devices 80 are input to a camera switch. The plurality of image capture devices 80 may be enabled based on the vehicle operating conditions 81, such as vehicle speed, turning a corner, or backing into a parking space. The camera switch 82 enables one or more cameras based on vehicle information 81 communicated to the camera switch 82 over a communication bus, such as a CAN bus. A respective camera may also be selectively enabled by the driver of the vehicle.

The captured images from the selected image capture device(s) are provided to a processing unit 22. The processing unit 22 processes the images utilizing a respective camera model as described herein and applies a view synthesis for mapping the capture image onto the display of the rearview mirror device 24.

A mirror mode button 84 may be actuated by the driver of the vehicle for dynamically enabling a respective mode associated with the scene displayed on the rearview mirror device 24. Three different modes include, but are not limited to, (1) dynamic rearview mirror with review cameras; (2) dynamic mirror with front-view cameras; and (3) dynamic review mirror with surround view cameras.

Upon selection of the mirror mode and processing of the respective images, the processed images are provided to the rearview image device 24 where the images of the captured scene are reproduced and displayed to the driver of the vehicle via the rearview image display device 24. It should be understood that any of the respective cameras may be used to capture the image for conversion to a virtual image for scene brightness analysis.

Figure 14:
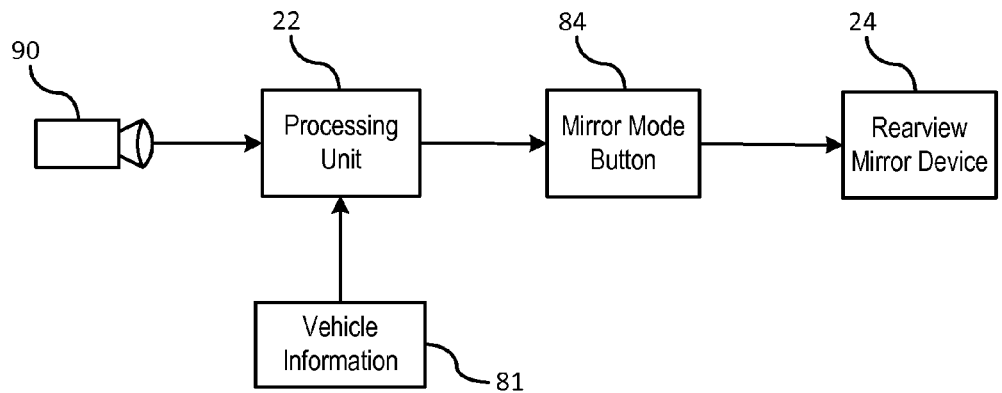
FIG. 14 illustrates a block diagram of a dynamic rearview mirror display imaging system using a single camera.

FIG. 14 illustrates an example of a block diagram of a dynamic rearview mirror display imaging system using a single camera. The dynamic rearview mirror display imaging system includes a single camera 90 having wide angle FOV functionality. The wide angle FOV of the camera may be greater than, equal to, or less than 180 degrees viewing angle.

If only a single camera is used, camera switching is not required. The captured image is input to the processing unit 22 where the captured image is applied to a camera model. The camera model utilized in this example includes an ellipse camera model; however, it should be understood that other camera models may be utilized. The projection of the ellipse camera model is meant to view the scene as though the image is wrapped about an ellipse and viewed from within. As a result, pixels that are at the center of the image are viewed as being closer as opposed to pixels located at the ends of the captured image. Zooming in the center of the image is greater than at the sides.

The processing unit 22 also applies a view synthesis for mapping the captured image from the concave surface of the ellipse model to the flat display screen of the rearview mirror.

The mirror mode button 84 includes further functionality that allows the driver to control other viewing options of the rearview mirror display 24. The additional viewing options that may be selected by driver includes: (1) Mirror Display Off; (2) Mirror Display On With Image Overlay; and (3) Mirror Display On Without Image Overlay.

"Mirror Display Off" indicates that the image captured by the capture image device that is modeled, processed, displayed as a de-warped image is not displayed onto the rearview mirror display device. Rather, the rearview mirror functions identical as a mirror displaying only those objects captured by the reflection properties of the mirror.

The "Mirror Display On With Image Overlay" indicates that the captured image by the capture image device that is modeled, processed, and projected as a de-warped image is displayed on the image capture device 24 illustrating the wide angle FOV of the scene. Moreover, an image overlay 92 (shown in FIG. 15) is projected onto the image display of the rearview mirror 24. The image overlay 92 replicates components of the vehicle (e.g., head rests, rear window trim, c-pillars) that would typically be seen by a driver when viewing a reflection through the rearview mirror having ordinary reflection properties. This image overlay 92 assist the driver in identifying relative positioning of the vehicle with respect to the road and other objects surrounding the vehicle. The image overlay 92 is preferably translucent or thin sketch lines representing the vehicle key elements to allow the driver to view the entire contents of the scene unobstructed.

The "Mirror Display On Without Image Overlay" displays the same captured images as described above but without the image overlay. The purpose of the image overlay is to allow the driver to reference contents of the scene relative to the vehicle; however, a driver may find that the image overlay is not required and may select to have no image overlay in the display. This selection is entirely at the discretion of the driver of the vehicle.

Based on the selection made to the mirror button mode 84, the appropriate image is presented to the driver via the rearview mirror in block 24. It should be understood that if more than one camera is utilized, such as a plurality of narrow FOV cameras, where each of the images must be integrated together, then image stitching may be used. Image stitching is the process of combining multiple images with overlapping regions of the images FOV for producing a segmented panoramic view that is seamless. That is, the combined images are combined such that there are no noticeable boundaries as to where the overlapping regions have been merged. After image stitching has been performed, the stitched image is input to the processing unit for applying camera modeling and view synthesis to the image.

Figure 15:
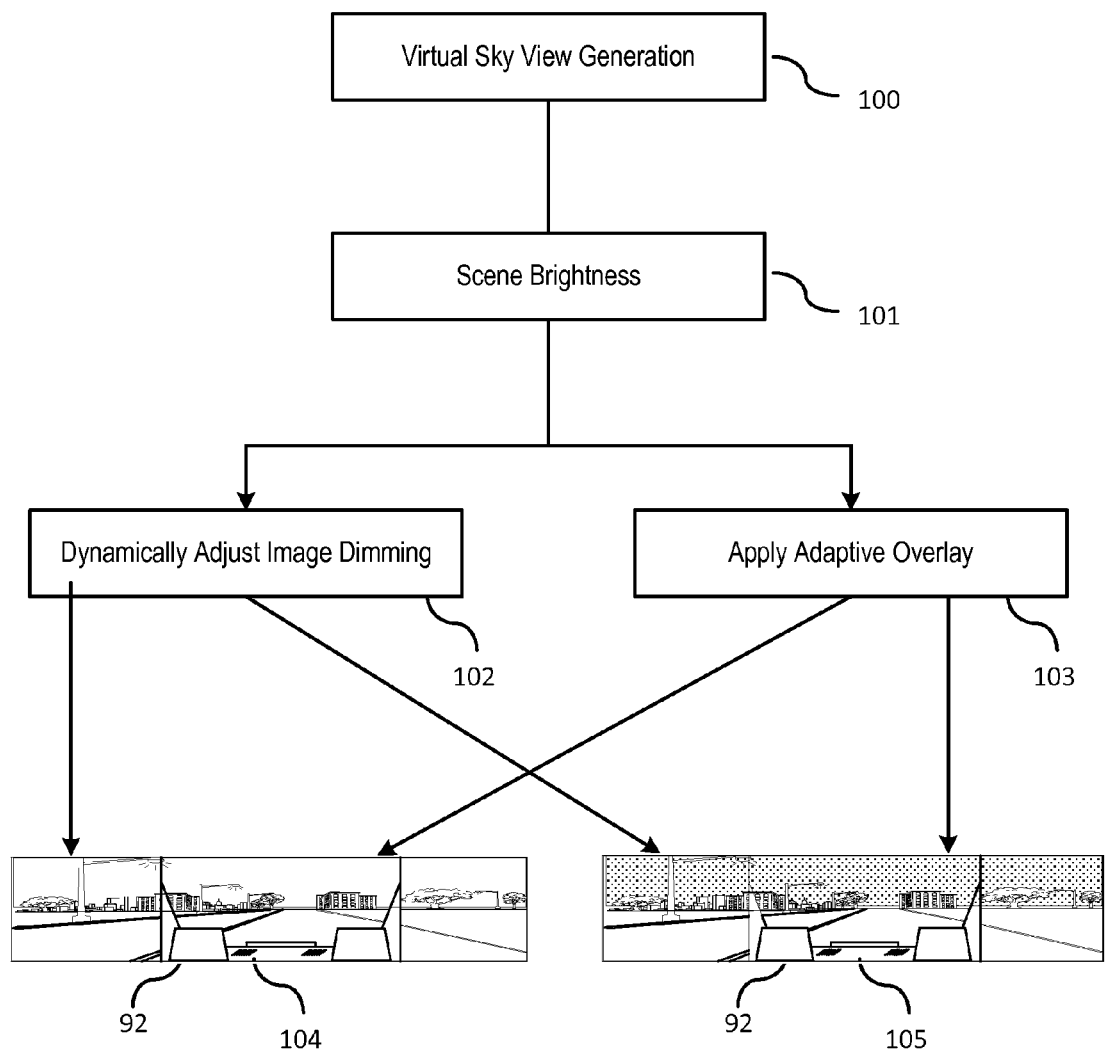
FIG. 15 illustrates a flowchart for adaptive dimming and adaptive overlay of an image in a rearview mirror device.

FIG. 15 illustrates a flowchart for adaptive dimming and adaptive image overlay of an image in a rearview mirror display device.

In block 100, a virtual sky view is generated from a real captured image. The virtual sky view may be generated utilizing any of the images captured by any of the images capture devices utilized on the vehicle; however, the real input image captured by the real image must have a FOV where at least a portion of the sky or other targeted region is captured in the image for detecting brightness of the scene.

In block 101, a brightness of the virtual image is determined. A process for determining a lighting condition of the virtual scene exterior of the vehicle is describe in co-pending application having an application Ser. No. 13/298,615 filed Nov. 17, 2011 which is incorporated by reference in its entirety. Details of the determining the lighting condition will be described in detail later.

In block 102, a scene brightness is dynamically adjusted based on the lighting conditions as detected in step 101.

In block 103, a graphic overlay is inserted on the image reproduced on the rearview display. The graphic overlay is also dynamically adjusted based on the determined lighting conditions so that it does not interfere with the reproduced image, or is adjusted to make visible in the reproduced image.

Block 104 represents a scene from a daytime condition, where the exterior scene is adjusted to compensate for bright illumination conditions. The road in addition to the graphic overlay may be darkened to compensate for bright illumination conditions occurring during the day.

Block 105 represents a scene from a nighttime condition where the exterior scene is adjusted to compensate for the darkened illuminations conditions. The road in addition to the graphic overlay may be lightened to compensate for the dark illumination conditions occurring during the nighttime scene.

Figure 16:
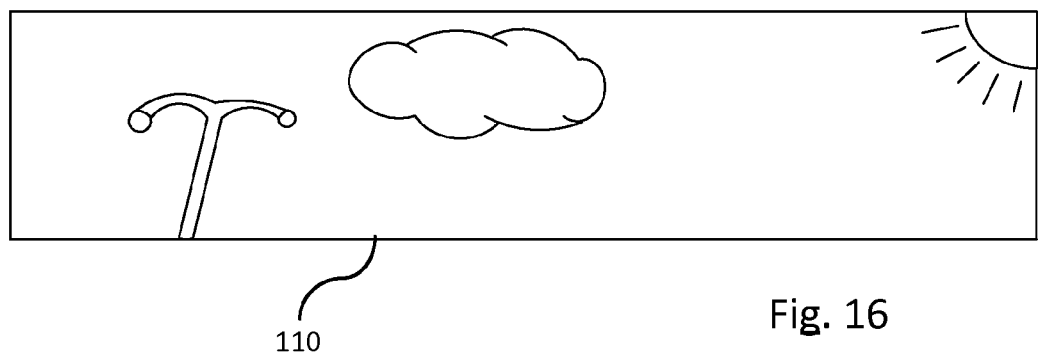
FIG. 16 illustrates an exemplary image of a virtual sky view for a daylight condition.

FIG. 16 illustrates an image 110 virtual sky-view generated by the imaging system for a daytime. The virtual sky-view is generated from an image captured by a real camera. The real camera (e.g., ultra-wide FOV) captures a portion of the sky. The imaging system generates a virtual image of the region of the sky based on the technique described earlier. The skyline is the best indicator for determining the lighting condition.

Any region within the virtual image may be selected for analyzing the lighting condition. It should be understood that various software programs could be utilized for analyzing the image and selecting the region that would be best suited for detecting the lighting condition of the environment exterior of the vehicle.

The in-vehicle technique for determining a lighting condition exterior of the vehicle may utilize thresholds or a classifier. While a classifier adds complexity within a vehicle and is data intensive, a technique utilizing thresholds may utilize a classifier during the training states for establishing the threshold. In the training mode, various images that include various lighting conditions are captured. In each image, a region of interest is identified that preferably relates to the skyline as shown in FIG. 16.

Figure 17:
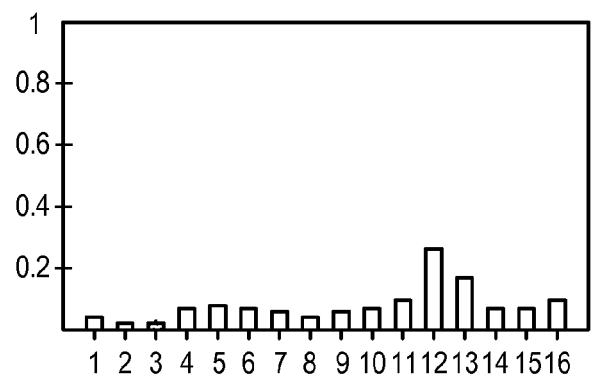
FIG. 17 is an example of an intensity histogram for the daylight condition.

For each image captured, an intensity histogram is generated. FIG. 17 illustrates an example of an intensity histogram. The region of interest of a respective image is analyzed. The image is produced from a plurality of pixels. Each pixel within the region of interest has an associated light intensity value. Each of the light intensity values are represented within the histogram.

The histogram is segregated into a plurality of category bins. As shown in FIG. 17, there are sixteen category bins. Intensity values that are close in intensity to one another may be grouped together. For example, if there are 256 possible light intensity values that a single pixel may represent, then the histogram as illustrated in FIG. 17 is segregated into sixteen categories with sixteen light intensity values within each category bin. Referring to FIG. 17, the first category bin will include light intensity values 1-16, the second category bin will include 17-32, the third category bin will include 33-48, and so forth. As a result, each intensity value for each pixel within the region of interest is assigned to a category bin based on their respective category bin. The vertical axis of the histogram represents an aggregate value of the pixels within the respective range of light intensity values assigned to that category bin. The aggregate value may be an aggregate number, a percentage, or other representation that identifies the pixels assigned to that category bin.

Figure 18:
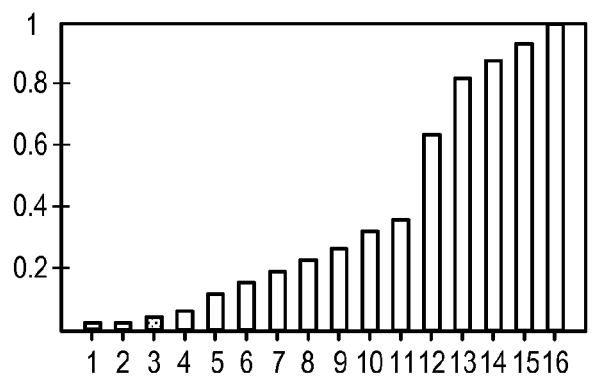
FIG. 18 is an example of a cumulative histogram for the daylight condition.

After the intensity values for each pixel is assigned to a respective category bin, a cumulative histogram is generated based on the intensity histogram. An exemplary cumulative histogram is illustrated in FIG. 18. A respective cumulative histogram is generated for each image for identifying a respective category bin that best distinguishes a daytime lighting condition from a nighttime lighting condition. In addition, a respective category bin may be used to distinguish obstructed daylight conditions from unobstructed daylight conditions. Obstructed daylight conditions would include a path travel being driven under a structure that obstructs the daylight. Examples include, but are not limited to, tunnels and bridges.

As described earlier, a plurality of cumulative histograms are generated that represent both daytime lighting environments and nighttime lighting environments. The data from the cumulative histograms are provided to a feature selection routine for identifying the respective category bins that best distinguish between a daytime lighting condition and a nighttime lighting condition. An example of a feature selection routine includes, but is not limited to, a Kullback-Leibler divergence methodology that uses a non-symmetric measurement of the difference between two probability distributions. The objective of the routine is to collectively analyze each of the correlating category bins of the cumulative histograms and identify the respective category bin that best distinguishes the daytime lighting environment from the nighttime lighting environment.

Once the respective category bin is identified, a first threshold is selected for identifying whether the image is obtained from a daytime environment or a nighttime environment. The aggregate value representing the light intensity value for the selected category bin is compared to the first threshold. If the aggregate value is greater than the first threshold, then a determination is made that image is captured during a nighttime lighting condition. Alternatively, if the aggregate value is less than the first threshold, then the determination is made that the image is captured during a daytime lighting condition.

In FIG. 18, category bin 3 is selected by the feature selection routine for distinguishing between the daytime and nighttime environment. A first threshold value of (e.g., 0.2) is used as a comparator to an aggregate value of the selected category bin (e.g., category bin 3) for determining whether the image is captured from the daytime lighting condition or the nighttime lighting condition. As shown in FIG. 18, the aggregate value of category bin 3 is less than 0.1. The aggregate value of the category bin (e.g., <0.1) is less than the first threshold value (e.g., 0.2). As a result, a determination is made that the exterior scene as captured by the image capture device occurred during a daytime condition. Moreover, the feature selection routine may further analyze the aggregate value or other criteria (e.g., other category bins) for determining the illumination intensity of the exterior scene, which may assist in determining an appropriate amount of dimming to apply to the reproduced image.

Figure 19:
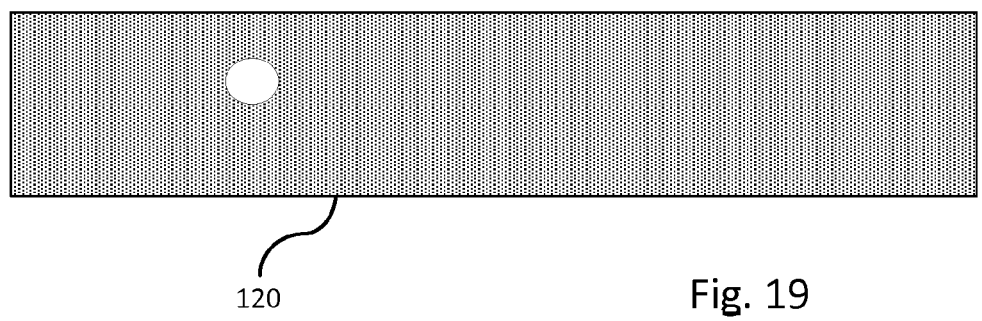
FIG. 19 illustrates an exemplary image of a virtual sky view of a nighttime condition.

FIG. 19 illustrates an image 120 of a virtual sky-view generated by the imaging system for a nighttime condition. The virtual sky-view is generated from an image captured by the real camera. As described earlier, the real camera (e.g., an ultra-wide FOV camera) captures a portion of the sky. The imaging system generates a virtual image of the region of the sky based on the technique described earlier.

Figure 20:
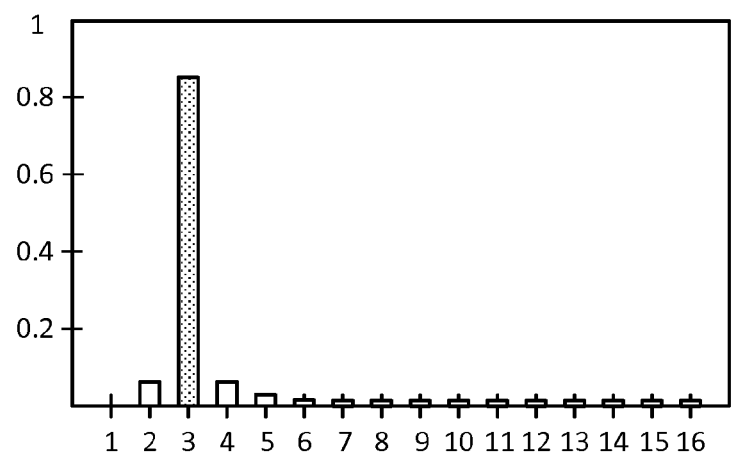
FIG. 20 is an example of an intensity histogram for the nighttime condition.

FIG. 20 illustrates an example of an intensity histogram. The region of interest of a respective image is analyzed. The image is produced from a plurality of pixels. Each pixel within the region of interest has an associated light intensity value. Each of the light intensity values are represented within the histogram. The histogram is segregated into a plurality of category bins. Similar to the histogram for the daylight condition, there are sixteen category bins. Intensity values that are close in intensity to one another may be grouped together. For example, if there are 256 possible light intensity values that a single pixel may represent, then the histogram as illustrated in FIG. 20 is segregated into sixteen categories with sixteen light intensity values within each category bin. Referring to FIG. 20, the first category bin will include light intensity values 1-16, the second category bin will include 17-32, the third category bin will include 33-48, and so forth. As a result, each intensity value for each pixel within the region of interest is assigned to a category bin based on their respective category bin. The vertical axis of the histogram represents an aggregate value of the pixels within the respective range of light intensity values assigned to that category bin. The aggregate value may be an aggregate number, a percentage, or other representation that identifies the pixels assigned to that category bin.

Figure 21:
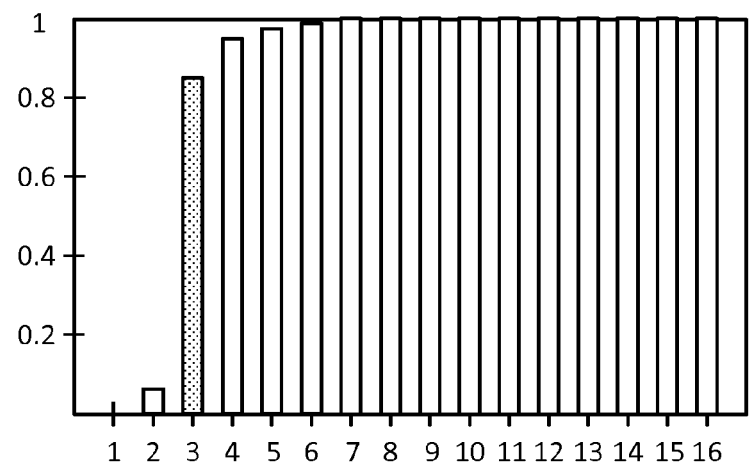
FIG. 21 is an example of a cumulative histogram for the nighttime condition.

After the intensity values for each pixel is assigned to a respective category bin, a cumulative histogram is generated based on the intensity histogram. An exemplary cumulative histogram is illustrated in FIG. 21. A respective cumulative histogram is generated for each image for identifying a respective category bin that best distinguishes a nighttime lighting condition from a daytime lighting condition. In addition, a respective category bin may be used to distinguish well-illumination conditions from poor illumination conditions during the nighttime.

As described earlier, training is conducted on sample images to collectively analyze each of the correlating category bins of the training cumulative histograms and identify a respective category bin that best distinguishes the daytime lighting environment from the nighttime lighting environment. In the example describe earlier, category bin 3 was identified as the respective bin that best distinguishes daytime lighting from nighttime lighting. If the aggregate value of the category bin of a respective cumulative histogram is less than the first threshold, then a determination is made that image is captured during a daytime lighting condition.

As shown in FIG. 21, the aggregate value of category bin 3 is approximately 0.9. Therefore, the aggregate value (e.g., 0.9) is greater than the first threshold value (e.g., 0.2). As a result, a determination is made that the exterior scene as captured by the image capture device occurred during a nighttime condition. Moreover, the feature selection routine may further analyze the aggregate value or other criteria (e.g., other category bins) for determining an illumination intensity value of the exterior scene, which may assist in determining an appropriate amount of dimming/or lighting enhancement to apply to the reproduced image.

The vision-based imaging system for determining the lighting condition exterior of the vehicle can be used to replace a conventional light sensor that is used in vehicle for automatic headlight control. On current vehicles, automatic headlight on/off and daytime running light control relies on a light sensor which is located behind the windshield and on the top of instrument panel to sense the lighting condition of environment the vehicle is traveling. When the sensor indicates that the environment lighting is not bright enough, such as in dusk, nighttime, traveling through a tunnel, or in a parking structure, the headlight will be automatically turned on. With the camera and vision based brightness estimation as described herein, the light sensor will be redundant and can be remove from the vehicle thereby saving cost of hardware, software, and complexity.

In addition, the light sensors used on the rearview mirror for auto-dimming can also be replaced by the present invention. Present vehicles utilize a light sensor mounted on a rearview mirror to detect glare from other vehicle headlamps and may automatically dim the rearview mirror and/or side mirrors using electrochromism. When the brightness sensing technique described herein is used on a rear-facing camera, the light sensor for auto-dimming function becomes redundant and can be replaced by the present camera-based brightness sensing technique. Moreover, the current rain sensing technique for automatic wiper control could also be replaced by the present camera-based method. Current rain sensing technique utilizes a infrared light emitter and photodetetcor which is mounted behind the windshield to detect the reflection of the windshield. The rain droplets on the windshield will decrease the amount of light to be reflected back by the outside of the windshield (water has larger refractive index than air). The more wetness the windshield is, the less reflection detected by the rain sensor. Hence, the rain sensor can sense the rain/snow condition and the amount of water accumulation on the windshield, and signal the wiper control unit for automatic on/off and adaptive speed control. The present camera based brightness detection technique can further be used to detect rainy and snowy weather conditions using image processing and computer vision techniques, which can replace the current light-based rain sensor.

While certain embodiments of the present invention have been described in detail, those familiar with the art to which this invention relates will recognize various alternative designs and embodiments for practicing the invention as defined by the following claims.

What is claimed is:

1. A vehicle imaging system comprising:
    an image capture device capturing an image exterior of a vehicle, the captured image including at least a portion of a sky scene;
    a processor generating a virtual image of a virtual sky scene from the portion of the sky scene captured by the image capture device, the processor determining a brightness of the virtual sky scene from the virtual image, the processor dynamically adjusting a brightness of the captured image based the determined brightness of the virtual image; and
    a rear view mirror display device for displaying the adjusted captured image;
    wherein an intensity histogram is generated for a region of interest within the virtual image for analyzing the illumination conditions, the region of interest being produced from a plurality of pixels, each pixel in the region of interest including an associated light intensity value, each of the light intensity values being utilized in the intensity histogram to determine the brightness of the illumination condition of the captured image;
    wherein the intensity histogram is segregated into a plurality of category bins with each bin representing a range of light intensity values, each pixel being allocated to a respective bin based on the light intensity value of each pixel;
    wherein a cumulative histogram is generated based on the intensity histogram, wherein the cumulative histogram is generated to identify a respective category bin that distinguishes a daytime lighting condition from a nighttime lighting condition.

2. A vehicle imaging system of claim 1 wherein dynamically adjusting the brightness of the captured image includes darkening a road of travel in the adjusted captured image to compensate for bright illumination conditions.

3. A vehicle imaging system of claim 1 wherein dynamically adjusting the brightness of the captured image includes lightening a road of travel in the adjusted captured image to compensate for darkened illumination conditions.

4. A vehicle imaging system of claim 1 wherein the region of interest is a skyline.

5. A vehicle imaging system of claim 1 wherein the image capture device includes a wide angle field of view image capture device.

6. A vehicle imaging system of claim 1 wherein an optical axis used to generate the virtual image is different than the optical axis of the real image, wherein compensation is generated to correlate a projection of a virtual incident ray and a real incident ray.

7. A vehicle imaging system of claim 1 wherein the rear view mirror display device includes a mirror display off setting, wherein the rearview mirror display device displays only objects captured by reflection properties of the rearview mirror display device.

8. A vehicle imaging system of claim 1 wherein the rear view mirror display device includes a mirror-display-on-without-image-overlay setting, wherein the rearview mirror display device displays only the adjusted captured image.

9. A vehicle imaging system of claim 1 wherein the rear view mirror display device includes a mirror-display-on-without-image-overlay setting, wherein the rearview mirror display device displays the adjusted captured image with an image overlay, wherein the image overlay replicates components of the vehicle that would be seen by a driver in the rearview mirror display device for assisting the driver in identifying relative positioning of the vehicle with respect to surrounding objects of the vehicle.

10. A vehicle imaging system of claim 9 wherein the image overlay replicates a rear window trim of the vehicle.

11. A vehicle imaging system of claim 9 wherein the image overlay replicates a headrest of the vehicle.

12. A vehicle imaging system of claim 9 wherein the image overlay replicates a c-pillar of the vehicle.

13. A vehicle imaging system of claim 1 wherein the captured image is a skyline.

14. A method for dynamically adjusting a brightness of an image on rearview display device, the method comprising the steps of:
    capturing an image exterior of a vehicle by an image capture device, the captured image including at least a portion of a sky scene;
    generating a virtual image of a virtual sky scene by a processor from the portion of the sky scene captured by the image capture device, the processor determining a brightness of the virtual sky scene from the virtual image, wherein determining the brightness of the virtual sky scene from the virtual image further comprises the steps of:
    generating an intensity histogram for a region of interest within the virtual image for analyzing the illumination conditions, wherein the region of interest is produced from a plurality of pixels, wherein each pixel in the region of interest includes an associated light intensity value, wherein each of the light intensity values are utilized in the intensity histogram for determining the brightness of the illumination condition of the captured image;

segregating the intensity histogram into a plurality of category bins, wherein each bin represents a range of light intensity values, and wherein each pixel is allocated to a respective bin based on the light intensity value of each pixel;

generating a cumulative histogram based on the intensity histogram, wherein the cumulative histogram is generated for identifying a respective category bin that distinguishes a daytime lighting condition from a nighttime lighting condition; dynamically adjusting a brightness of the captured image based on the determined brightness of the virtual image; and displaying the adjusted captured image on a rear view mirror display device for displaying the adjusted captured image.

15. The method of claim 14 wherein dynamically adjusting the brightness of the captured image includes darkening a road of travel in the adjusted captured image to compensate for bright illumination conditions.

16. The method of claim 14 wherein dynamically adjusting the brightness of the captured image includes lightening a road of travel in the adjusted captured image to compensate for darkened illumination conditions.

17. The method of claim 14 wherein the region of interest is a skyline.

18. The method of claim 14 wherein an optical axis used to generate the virtual image is different than the optical axis of the real image, wherein compensation is generated to correlate a projection of a virtual incident ray and a real incident ray.

19. The method of claim 14 wherein the rear view mirror display device includes a mirror-display-off setting, wherein the rearview mirror display device displays only objects captured by reflection properties of the rearview mirror display device when the mirror-display-off setting is enabled.

20. The method of claim 14 wherein the rear view mirror display device includes a mirror-display-on-without-image-overlay setting, wherein the rearview mirror display device displays only the adjusted captured image when the mirror-display-on-without-image-overlay setting is enabled.

21. The method of claim 14 wherein the rear view mirror display device includes a mirror-display-on- without-image-overlay setting, wherein the rearview mirror display device displays the adjusted captured image with an image overlay when the mirror-display-on- without-image-overlay setting is enabled, wherein the image overlay replicates components of the vehicle that would be seen by a driver in the rearview mirror display device for assisting the driver in identifying relative positioning of the vehicle with respect to surrounding objects of the vehicle.

22. The method of claim 21 wherein the image overlay replicates a rear window trim of the vehicle.

23. The method of claim 21 wherein the image overlay replicates a headrest of the vehicle.

24. The method of claim 21 wherein the image overlay replicates a c-pillar of the vehicle.

25. The method of claim 14 wherein dynamic view synthesis is enabled based on a driving scenario of a vehicle operation, wherein the dynamic view synthesis generates a direction zoom to a region of the image for enhancing visual awareness to a driver for the respective region.

26. The method of claim 25 wherein the driving scenario for enabling the dynamic view synthesis includes determining whether the vehicle is driving in a parking lot.

27. The method of claim 25 wherein the driving scenario for enabling the dynamic view synthesis includes determining whether the vehicle is driving in on highway.

28. The method of claim 25 wherein the driving scenario for enabling the dynamic view synthesis includes actuating a turn signal.

29. The method of claim 25 wherein the driving scenario for enabling the dynamic view synthesis is based on a steering wheel angle.

30. The method of claim 25 wherein the driving scenario of a vehicle operation for enabling the dynamic view synthesis is based on a speed of the vehicle.

* * * * *